(12) United States Patent
Davis

(10) Patent No.: US 6,299,232 B1
(45) Date of Patent: Oct. 9, 2001

(54) REMOVEABLE VEHICLE BED COVER

(76) Inventor: Edgar Davis, 1648 Adams SE., Grand Rapids, MI (US) 49506

( * ) Notice: Subject to any disclaimer, the term of this patent is extended or adjusted under 35 U.S.C. 154(b) by 0 days.

(21) Appl. No.: 09/431,646

(22) Filed: Nov. 1, 1999

(51) Int. Cl.[7] .................................................. B60P 7/02
(52) U.S. Cl. ............................. 296/100.07; 296/100.09; 292/DIG. 43
(58) Field of Search .................. 296/100.01, 100.02, 296/100.04, 100.06, 100.07, 100.09, 16; 292/DIG. 43, DIG. 29, 36, 41

(56) References Cited

U.S. PATENT DOCUMENTS

| | | | |
|---|---|---|---|
| D. 181,736 | 12/1957 | Lee | D12/404 |
| D. 263,947 | 4/1982 | Hardin | D12/404 |
| D. 281,487 | 11/1985 | Chapman | D12/404 |
| D. 294,242 | 2/1988 | O'Neill | D12/404 |
| D. 312,065 | 11/1990 | Karrer | D12/404 |
| 2,531,140 | 11/1950 | Linde | 296/100.08 |
| 3,489,456 | 1/1970 | Klanke | 296/100.07 |
| 3,514,152 | 5/1970 | Hermon | 296/100.09 |
| 3,690,719 | 9/1972 | Yount | 296/164 |
| 3,721,467 | 3/1973 | Kerr | 296/183 |
| 3,829,151 | 8/1974 | Fellenstein | 296/64 |
| 4,335,916 | 6/1982 | Gutgsell | 296/100.1 |
| 4,418,954 | 12/1983 | Buckley | 296/100.09 |
| 4,615,557 | 10/1986 | Robinson | 296/100.07 |
| 4,747,441 | 5/1988 | Apolzer et al. | 160/206 |
| 4,824,162 | 4/1989 | Geisler et al. | 296/100.09 |
| 4,844,531 | 7/1989 | Kooiker | 296/100.09 |
| 4,861,092 | 8/1989 | Bogard | 296/100.09 |
| 4,946,217 | 8/1990 | Steffens et al. | 296/100.09 |
| 5,054,402 | 10/1991 | Brassell | 105/377.01 |
| 5,213,390 | 5/1993 | Borchers | 296/165 |
| 5,263,761 | 11/1993 | Hathaway et al. | 296/100.18 |
| 5,382,010 | 1/1995 | Gerdes et al. | 296/41 |
| 5,653,491 | 8/1997 | Steffens et al. | 296/100.09 |
| 5,743,586 | 4/1998 | Nett | 296/100.02 |
| 5,857,729 | 1/1999 | Bogard | 296/100.09 |

*Primary Examiner*—D. Glenn Dayoan
*Assistant Examiner*—Patricia Engle

(57) ABSTRACT

According to yet another embodiment, the present invention provides a pickup truck bed cover including a truck bed having side walls, a front end, and an end gate defining the interior of the truck bed; a stationery cover portion shaped to partially cover the truck bed; a moveable portion shaped to cover a remaining part of the truck bed; and a piano hinge extending across the width of the truck bed and connecting the stationary cover and the moveable cover portion. The stationary cover portion includes first quick release toggle clamps arranged around the edges of the stationary cover portion that are configured to releasably engage the side walls of the truck bed from the interior of the truck bed. The moveable portion includes a second quick release toggle clamps arranged around the edges of the moveable cover portion that are configured to releasably engage the side walls of the truck bed from the interior of the truck bed. This allows the cover to be quickly removed from the truck, does not damage or require alteration of the truck bed, and provides a way to secure and protect the contents within the truck bed.

11 Claims, 2 Drawing Sheets

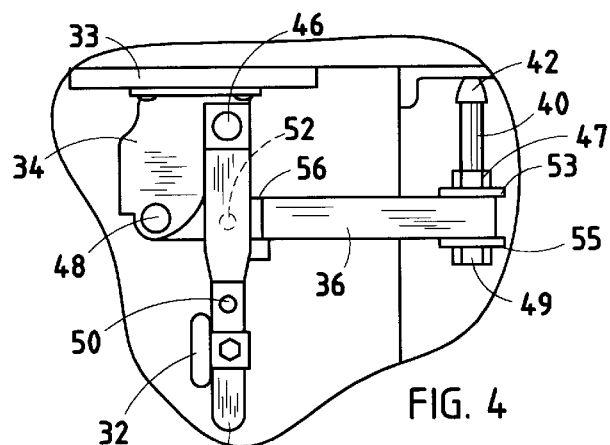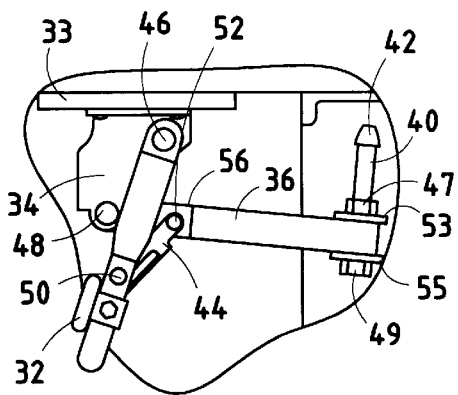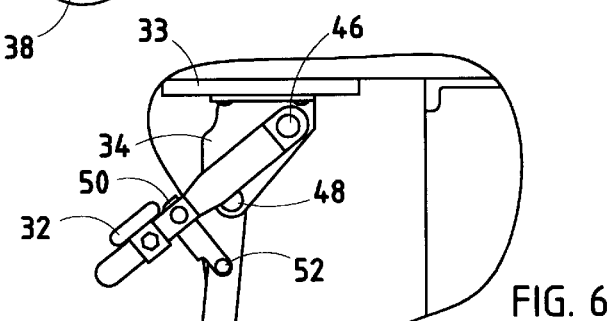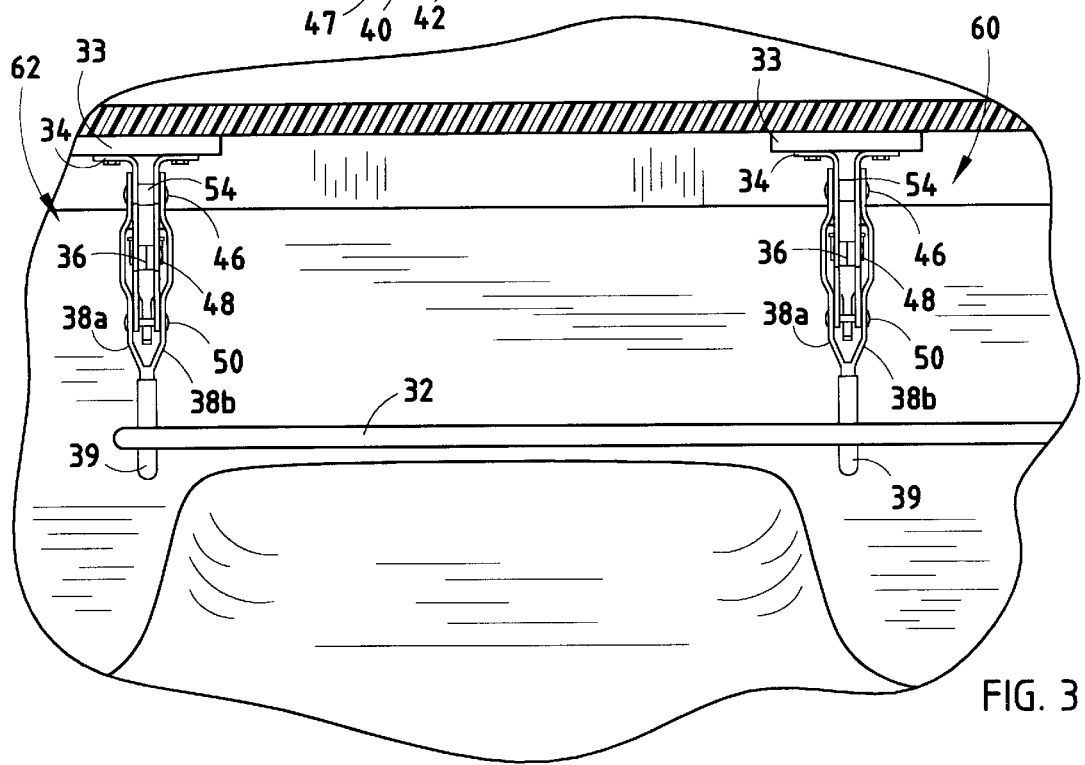

REMOVEABLE VEHICLE BED COVER

BACKGROUND OF THE INVENTION

The present invention generally relates to vehicle compartment covers, and more particularly, to truck bed covers.

The truck bed of a pickup truck is well adapted for hauling and storing any number of assorted items because it is open and easy to access. Unfortunately, the materials hauled in the truck bed are typically exposed to the elements as well as to theft and vandalism. It is desirable to cover the contents and provide security, while still maintaining easy access to the contents.

Some truck bed covers utilize snaps along the edges of a cover material and along the edges of the truck bed to affix the cover over the truck bed. However, snaps break off or become damaged.

Another approach previously taken to cover a truck bed and protect its contents is to provide hinged sections locked closed using a mechanism that activates a pair of locking rods. The locking rods engage locking lugs mounted on the side walls of the truck bed. Unfortunately, this mechanism is heavy, does not allow the cover arrangement to be readily completely removed from the truck bed, and requires a locking lug be mounted to the truck bed, which can potentially damage the truck bed.

Accordingly, there is a need for a secure, readily removeable, easily manufactured, relatively lightweight, and inexpensive apparatus to cover truck beds that does not require installation of any hardware that may damage or mar the truck bed.

SUMMARY OF THE INVENTION

The present invention improves upon the earlier truck bed cover by providing a cover for a vehicle bed having side walls having: a fixed portion with a front edge, a back edge, a first side, and a second side; a moveable portion having a front edge, a back edge, a first side, and a second side; a hinge connecting the fixed portion to the moveable portion; and first and second clamps operatively connected to the moveable portion along the sides of the moveable portion. The first and second clamps engage and disengage the moveable portion from the side walls of the vehicle bed.

According to another aspect, the present invention provides a vehicle bed cover for covering a truck bed having a stationary cover portion shaped to partially cover the truck bed, and a moveable cover portion shaped to cover the remaining portion of the truck bed. The stationary cover portion includes first toggle operated clamps arranged around edges of the stationary cover portion that are configured to releasably engage the side walls of the truck bed. The moveable cover portion includes second toggle operated clamps arranged around edges of the moveable cover portion that are configured to releasably engage the side walls of the truck bed.

According to yet another embodiment, the present invention provides a pickup truck bed cover including a truck bed having side walls, a front end, and an end gate defining the interior of the truck bed; a stationery cover portion shaped to partially cover the truck bed; a moveable cover portion shaped to cover a remaining portion of the truck bed; a piano hinge extending across the width of the truck bed and connecting the stationary cover portion and the moveable cover portion; and an elastomeric water resistant operatively connected to the stationary cover portion and the moveable cover portion. The stationary cover portion includes first quick release toggle clamps arranged around the edges of the stationary cover portion that are configured to releasably engage the side walls of the truck bed from the interior of the truck bed. The moveable portion includes second quick release toggle clamps arranged around the edges of the moveable cover portion that are configured to releasably engage the side walls of the truck bed from the interior of the truck bed. The piano hinge is adapted to allow the moveable portion to be operable between an open position and a closed position. The waterproof seal is adapted to prevent water and other substances from entering the truck bed.

These and other features, advantages and objects of the present invention will be further understood and appreciated by those skilled in the art by reference to the following specification, claims, and appended drawings.

BRIEF DESCRIPTION OF THE DRAWINGS

FIG. 3 is the cross-sectional view taken along line III—III in FIG. 1.

FIG. 4 is an enlarged fragmentary view of the preferred quick release toggle clamps of the present invention with the toggle clamps in the closed position;

FIG. 5 is an enlarged fragmentary view of the preferred quick release toggle clamps of the present invention with the toggle clamps in the partially open position; and FIG. 6 is an enlarged fragmentary view of the preferred quick release toggle clamps of the present invention with the toggle clamps in the fully open released position.

DETAILED DESCRIPTION OF PREFERRED EMBODIMENT

Figure 1:
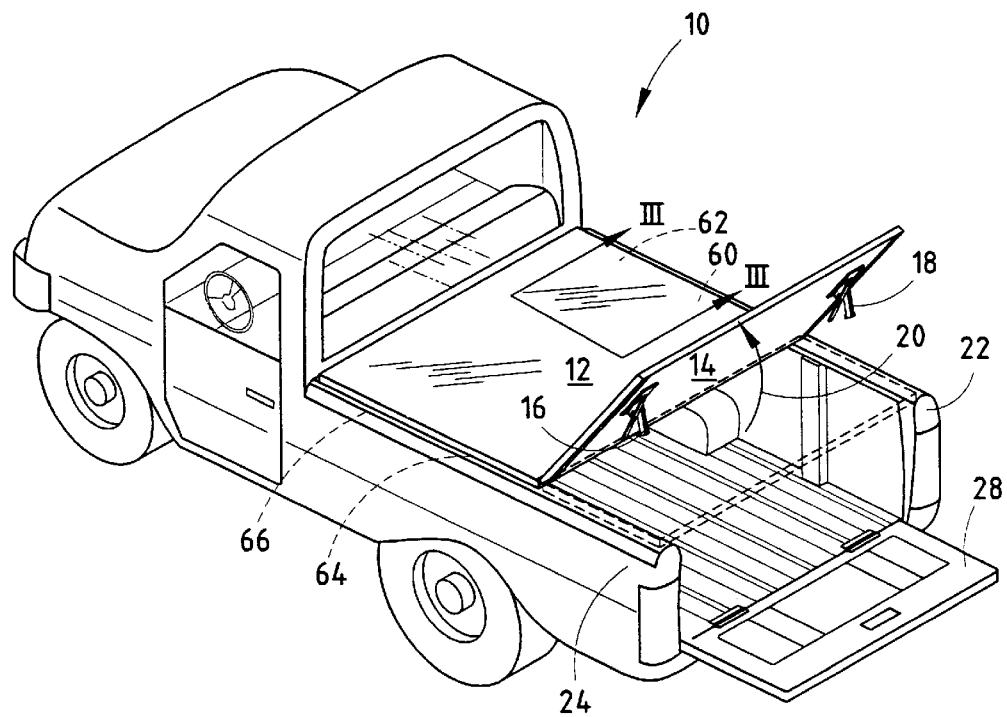
FIG. 1 is a perspective view of a pickup truck with a cover in accordance with the present invention.
Figure 2:
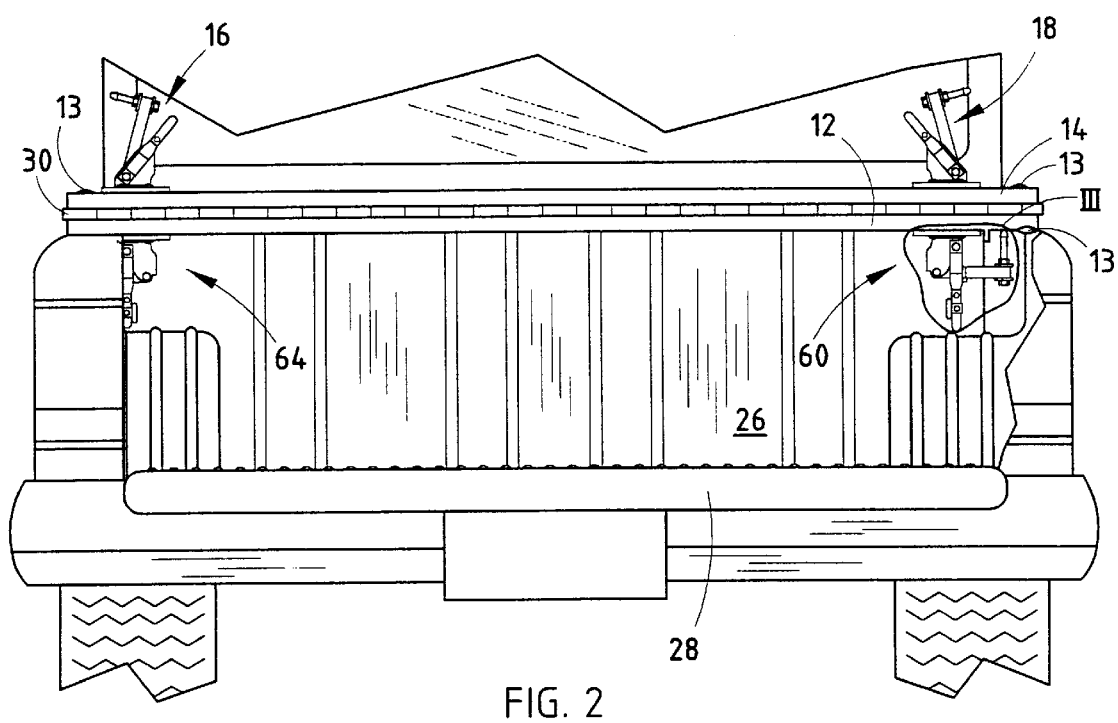
FIG. 2 is a partial fragmentary elevational end view of a pickup truck with the cover in accordance of the present invention where the moveable portion is fully open and laying flat atop the fixed portion of the preferred embodiment.

FIG. 1 shows the preferred pickup truck bed cover 10 including a fixed or stationary portion 12 and a moveable portion 14. When the first and second quick release toggle clamps 16, 18 are released, the moveable portion may be swung open, as indicated by arrow 20, to allow access to the bed of the truck. The truck bed consists of a first side wall 22, a second side wall 24, a front end 26, and an end gate 28 defining the interior of the pickup truck bed. The fixed portion and the moveable portion are substantially flat and are preferably made of wood, but plastic, or another rigid material may be used. The fixed portion and the moveable portion are interconnected with at least one hinge, preferably a piano hinge 30, which extends across the width of the truck bed. When the moveable portion is placed in the closed position, shown in phantom in FIG. 1, and quick release clamps 16, 18 are closed, they engage the side walls of the truck bed and the moveable portion is locked in position. The end gate, preferably containing a locking mechanism (not shown) can then be closed and locked to secure the contents of the truck bed. This prevents possible theft and vandalism.

Closing the truck bed cover also protects its contents from the weather. To prevent the weather elements, water, and other materials from entering the truck bed, a waterproof seal 13, typically of rubber or other elastomeric material, is attached to the edges of the fixed portion and the moveable portion such that waterproof seal 13 provides a barrier between the truck bed and the truck bed cover. This waterproof seal 13 also helps to prevent the rigid cover from damaging, scratching, or denting the truck bed by providing a soft contact surface.

Preferably, there are two quick release toggle clamps 16, 18 attached to the moveable portion near the end gate such that the user can open the end gate and readily release the quick release toggle clamps to allow the moveable portion to open. Preferably, the fixed portion is attached to the truck bed utilizing two quick release toggle clamps on each side 60, 62, 64, 66, although one quick release toggle clamp on each side may be used. As shown in FIG. 3, the two quick release toggle clamps on each side of the fixed portion may be interconnected with a lift bar 32. Once moveable portion 14 is open, the preferred lift bar 32 arrangement allows the user to reach under the fixed portion and release both quick release toggle clamps in one motion. This facilitates complete removal of the truck bed cover as the user does not have to crawl under the fixed portion to the front of the truck bed to release both quick release toggle clamps.

The quick release toggle clamps used to hold the fixed portion and moveable portion to the truck bed are identical, except for the possible adaptation to affix lift bar 32 to the handle. The structure and movement of the quick release toggle clamps are shown in FIGS. 4–6. FIG. 4 shows the quick release toggle clamps in its closed position. Support mounts 33 are spaced between each of the quick release toggle clamps and the fixed or moveable portion to allow longer fasteners, preferably screws, to be used to attach the anchor arm 34 to either of the fixed or moveable portions. This arrangement provides a more secure connection. While the support mounts are not necessary, they provide added strength.

The quick release toggle clamps are manually-operable and include an anchor arm 34, a clamping arm 36, a handle 38, a clamping foot 40 including a rubber stop 42, and a driving link 44. Clamping foot 40 may be adjusted up or down to provide extra force to the side walls of the truck bed. To adjust clamping foot 40, the nuts 47, 49 are loosened and clamping foot 40 is lengthened until the desired length of clamping foot 40 is reached. Lastly, the nuts 47, 49 are tightened to secure clamping foot 40 at the desired length. Lengthening clamping foot 40 and extending clamping foot 40 further above clamping arm 36, applies a greater force to the side wall of the truck when the quick release toggle clamps are closed, while shortening clamping foot 40 provides less force. Nuts 47, 49 are spaced from clamping arm 36 using washers 50, 52.

As shown in FIGS. 3–6, anchor arm 34, clamping arm 36, and driving link 44 are preferably interconnected with a series of four pivot bolts 46, 48, 50, 52. Pivot bolt 46 anchors both sides of handle 38 to anchor arm 34. As shown if FIG. 3, there is a spacer 54 between each side of anchor arm 34 to provide strength and stability. Pivot bolt 48 pivotally attaches clamping arm 36 to anchor arm 34. Pivot bolt 50 pivotally interconnects driving link 44 and handle 38. Pivot bolt 52 pivotally interconnects driving link 44 and clamping arm 36. Clamping arm 36 is preferably, but need not be, made of two pieces of metal that abut each other where clamping arm 36 is pivotally bolted to driving link 44 and anchor arm 34. From diversion point 56 towards clamping foot 36, the two sections of clamping arm 36 separate just wide enough for clamping foot 40 to be inserted between the two pieces of metal. The washers 53, 55 and nuts 47, 49 hold the two pieces of metal together near the end of clamping foot 40. Preferably, the washers 53, 55 are bent over the sides of the two pieces of metal forming clamping arm 36 to assist in holding the two portions together.

FIG. 4 shows the quick release toggle clamps in the closed position. In this position, driving link 44 is parallel and inline with handle 38. In this configuration, driving link 44 applies a significant amount of force to clamping arm 36 and thereby also to clamping foot 40.

As handle 38 is pulled toward the open position, as shown in FIG. 5, initially, clamping foot 40 withdraws slowly as driving link 44 pulls clamping arm 36 downward. After this initial movement, driving link 44 dramatically increases the speed by which clamping arm 36 is drawn away from the side wall of the truck bed until it reaches the completely open position of FIG. 6.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A cover for a vehicle bed having an end gate and side walls, said side walls including top side rails having an upper surface and a lower surface, said cover comprising:

a fixed portion having a front edge, a back edge, a first side, and a second side;

a moveable portion having a front edge, a back edge, a first side, and a second side;

a hinge connecting the fixed portion to the moveable portion; and first and second quick release toggle clamps accessible through said end gate and operatively connected to the moveable portion along the sides of the moveable portion, the first and second quick release toggle clamps being adapted to engage with and disengage the moveable portion from the upper surface of said side rails of said side walls of the vehicle bed by directly clamping said lower surface of said side rails of said side walls.

2. The cover for a vehicle bed of claim 1, wherein the quick release toggle clamps include a foot adapted to engage the side walls of the vehicle bed.

3. The cover for a vehicle bed of claim 2, wherein the quick release clamps include a resilient non-marring foot.

4. The cover for a vehicle bed of claim 3, wherein the hinge is a piano hinge.

5. The cover for a vehicle bed of claim 4, wherein the fixed and moveable portions are relatively flat.

6. The cover for a vehicle bed of claim 1, wherein the hinge is a piano hinge.

7. The cover for a vehicle bed of claim 1 further comprising third and fourth quick release toggle clamps operatively connected along the first side of the fixed portion and fifth and sixth quick release toggle clamps operatively connected along the second side of the fixed portion, the quick release toggle clamps being adapted to engage and disengage the fixed portion with the side walls of the vehicle bed.

8. The cover for a vehicle bed of claim 7, wherein the third and fourth quick release toggle clamps are interconnected with a first lift bar and said fifth and sixth quick release toggle clamps are interconnected with a second lift bar such that the first and second lift bars allow for the easy simultaneous release of the interconnected quick release toggle clamps.

9. The cover for a vehicle bed of claim 1, wherein the cover has a top surface and a bottom surface and further comprises a water resistant seal mounted on the bottom surface of the cover along the front edge, the first side and second side of the moveable portion, the first side, the second side, and the back edge of the fixed portion to prevent water and other substances from entering the vehicle bed.

10. The cover for a vehicle bed of claim 1, wherein the fixed and moveable portions are constructed from one or more of wood, a rigid plastic material, and compositions made therefrom.

11. The cover for a vehicle bed of claim 1 further comprising support mounts operatively connected to a bottom surface of the cover, wherein the quick release toggle clamps are mounted to the support mounts.

* * * * *